United States Patent
Lin et al.

(10) Patent No.: US 9,395,825 B2
(45) Date of Patent: Jul. 19, 2016

(54) TOUCH INPUT DEVICE

(71) Applicant: Raydium Semiconductor Corporation, Hsinchu (TW)

(72) Inventors: Chia-Hsiu Lin, Hsinchu (TW); Te-Chang Lin, Hsinchu (TW); Ya-Ling Lu, Pingtung (TW); Yi-Ming Chen, Tainan (TW); Wei-Yuan Cheng, Taichung (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 7 days.

(21) Appl. No.: 14/448,424

(22) Filed: Jul. 31, 2014

(65) Prior Publication Data

US 2015/0035808 A1 Feb. 5, 2015

(30) Foreign Application Priority Data

Aug. 1, 2013 (TW) .............................. 102127635 A

(51) Int. Cl.
*G06F 3/033* (2013.01)
*G06F 3/0354* (2013.01)
*G06F 3/041* (2006.01)

(52) U.S. Cl.
CPC ............ *G06F 3/03545* (2013.01); *G06F 3/033* (2013.01); *G06F 3/041* (2013.01); *G06F 3/0414* (2013.01)

(58) Field of Classification Search
CPC combination set(s) only.
See application file for complete search history.

(56) References Cited

U.S. PATENT DOCUMENTS

| 2011/0304577 | A1* | 12/2011 | Brown | G06F 3/044 345/174 |
| 2012/0256944 | A1* | 10/2012 | Crumly | G06K 9/222 345/611 |
| 2014/0253521 | A1* | 9/2014 | Hicks | G06F 3/03545 345/179 |

* cited by examiner

*Primary Examiner* — Jason Olson
*Assistant Examiner* — Sosina Abebe

(57) ABSTRACT

A touch input device includes a body and a sensing module. The body has an external surface which encloses an accommodation space. The sensing module is disposed in the accommodation space and includes a sensing unit and a signal operation unit. The sensing unit generates a sensing signal. The signal operation unit generates a surface result signal according to the sensing signal to adjust a surface character of the external surface.

13 Claims, 6 Drawing Sheets

TOUCH INPUT DEVICE

BACKGROUND OF THE INVENTION

1. Field of the Invention

The present invention generally relates to a touch input device. Particularly, the present invention relates to a touch input device, which can improve the input efficiency and promote the holding feeling.

2. Description of the Related Art

In conventional touch input devices, the touch action is mostly conducted with a finger. For example, touch input devices include industry computers, tablet computers, portable communication devices, automatic teller machines, laptop computers, electronic books, or other electronic devices. Touch input devices are widely used because of their instinct operations. However, as the size of touch screen shrinks, the sensitivity of touch sensing has to be promoted. In practical, fingers cannot make a very precise touch, impairing the sensing accuracy of the touch input device.

In recent years, research and development people attempt to utilize the touch pen, instead of fingers, to improve the precision of touch. For example, some portable communication devices and tablet computers gradually utilize the touch pen, instead of fingers, to conduct the touch action. In practical applications, the touch pen touches the touch surface with the pen head. Particularly, one touch pen can adapt different kinds of pen heads, wherein each pen head has a different shape to provide a specific function. However, when the user intends to perform a different function, the pen head needs to be changed. That is, it takes extra time for the user to change the pen head and extra space is required to store the spare pen heads. Consequently, the change of pen head is inconvenient and reduces the operation efficiency.

In addition, the shaft of the touch pen is generally not custom-made. That is, the shape of the shat is not changeable to accommodate the holding habit of individual user. Therefore, when the user holds the touch pen, the user needs to adjust the holding gesture to accommodate the pen shaft. Consequently, conventional touch pens cannot intelligently provide a better holding feeling.

SUMMARY OF THE INVENTION

In view of the prior arts, it is an object of the present invention to provide a touch input device, which can improve the input efficiency and provide a better holding feeling.

It is another object of the present invention to provide a touch input device, which can intelligently modify the pen head to improve the input efficiency.

It is a further object of the present invention to provide a touch input device which can sense the degree of holding to adjust the surface structure of the holding surface.

In one aspect, the present invention provides a touch input device including a body and a sensing module. In one embodiment, the body has an external surface enclosing an accommodation space. The sensing module is disposed in the accommodation space and includes a sensing unit and a signal operation unit, wherein the sensing unit generates a sensing signal. The signal operation unit generates a surface result signal according to the sensing signal to adjust a surface character of the external surface.

In comparison with the prior art, the touch input device of the present invention utilizes the sensing unit to generate the sensing signal to adjust the surface character of the external surface. Particularly, the external surface includes a pen head surface and a holding surface. The surface character includes a contour profile, a surface hardness, a friction coefficient, etc. In an embodiment, the touch input device can modify the pen head surface according to the surface structure of the display touch surface and adjust the holding surface according to the degree of touch on the holding surface to improve the input efficiency and promote the holding feeling.

The advantages and spirit of the invention can be further understood in view of the detailed descriptions and the accompanying drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

According to an embodiment of the present invention, a touch input device is provided. Particularly, the touch input device of the present invention includes a touch pen, which can adjust the surface character of the pen head surface according to the surface structure of the display touch surface.

Figure 1:
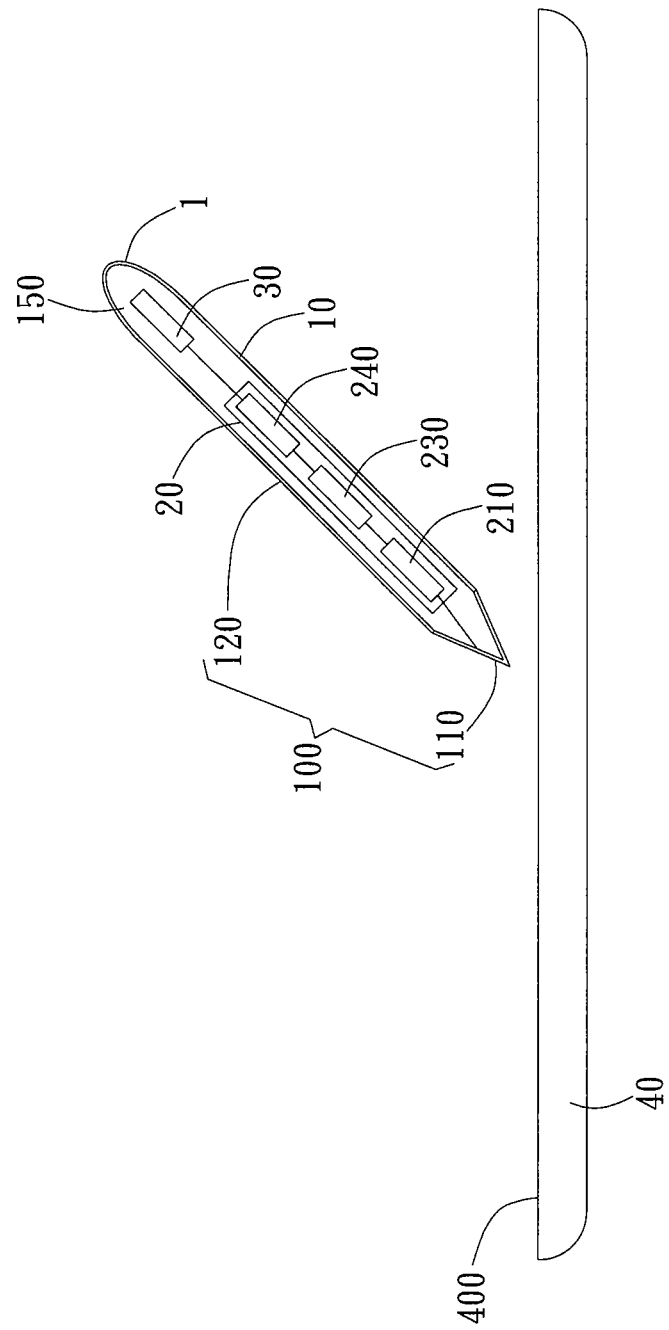
FIG. 1 is a schematic view of the touch input device in an embodiment of the invention.

Please refer to FIG. 1, which is a schematic view of the touch input device in an embodiment of the invention. As shown in FIG. 1, the touch input device 1 includes a body 10, a sensing module 20, and a decoding module 30, wherein the decoding module 30 is coupled to the sensing module 20. In this embodiment, the body 10 has an external surface 100, wherein the external surface 100 encloses an accommodation space 150 and includes a touch end surface 110 and a holding surface 120. The holding surface 120 is connected to the touch end surface 110. In practical applications, the touch end surface 110 serves as the touch end of the touch input device 1; the holding surface 120 serves as the surface area which is held by the user when the user holds the touch input device 1. Moreover, the sensing module 20 is disposed in the accommodation space 150 and includes a sensing unit 210, a signal-amplifying unit 230, and a signal operation unit 240.

Particularly, the sensing unit 210 generates a sensing signal to adjust the surface character of the external surface 100. It is noted that the sensing unit 210 can generate the sensing signal by sensing the surface structure, the relative angle, or the degree of touch, but not limited thereto. Moreover, the sensing signal includes a surface-sensing signal, an angle-sensing signal, and/or a touch-sensing signal. In an embodiment, the sensing unit 210 senses the surface structure of a display touch surface 400 to generate the sensing signal, and the signal operation unit 230 can operate the sensing signal. It is noted that the display touch surface 400 serves as the touch surface and the display surface of a display integration module 40, and the touch input device 1 touches the display touch surface 400 of the display integration module 40 by the touch end surface 110. For example, the display integration module 40 can be a tablet computer, a laptop computer, an electronic book, or an interactive billboard, but not limited thereto.

In addition, the signal-amplifying unit 230 is coupled between the sensing unit 210 and the signal operation unit 240, wherein the signal-amplifying unit 230 amplifies the sensing signal and transmits the sensing signal to the signal operation unit 240. In practical applications, the signal-amplifying unit 230 is an amplifier, which can amplify the amplitude of the sensing signal to increase the signal strength.

It is noted that the signal operation unit 240 generates a surface result signal according to the surface-sensing signal to adjust the surface character of the external surface 100, wherein the surface character includes contour profile, surface hardness, or other surface characters. For example, the signal operation unit 240 has a lookup table, wherein each surface-sensing signal has a corresponding surface result signal, so that the signal operation unit 240 can determine the surface result signal according to the magnitude of the surface-sensing signal. However, in other embodiments, the signal operation unit can determine the surface result signal according to other suitable logic operations, not limited to the embodiment.

The signal operation unit 240 operates the surface-sensing signal to generate the surface result signal and transmits the surface result signal to the decoding module 30. The decoding module 30 receives the surface result signal and generates a surface-adjusting signal based on the surface result signal to adjust the surface character of the external surface. The surface result signal includes a deformation signal, a surface hardness signal, or other result signals, as appropriate.

Figure 2:
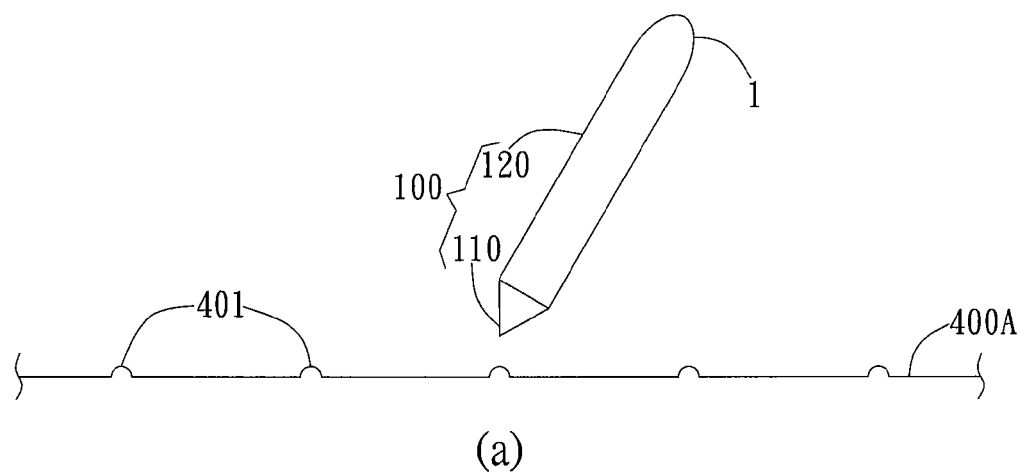
FIG. 2 is a schematic view of the touch input device sensing the display touch surface in an embodiment of the invention.
Figure 2:
Figure 2:
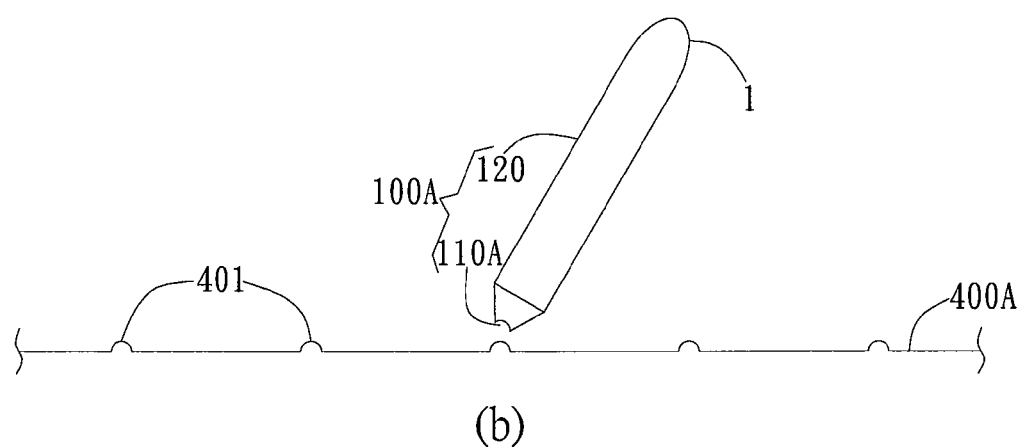

Referring to FIG. 2, FIG. 2 is a schematic view of the touch input device sensing the display touch surface in an embodiment. As shown in FIG. 2(a), the display touch surface 400A includes a plurality of touch bumps 401. In practical applications, the shape of the touch bumps 401 is a semi-circular arc, but not limited thereto. As shown in FIG. 2(b), when the touch input device 1 approaches close to the display touch surface 400A, the sensing unit 210 senses the surface structure of the display touch surface 400A to generate the deformation signal, and the signal operation unit 240 adjusts the contour profile of the touch end surface 110 according to the deformation signal (i.e. the surface result signal).

As shown in FIG. 2, the touch end surface 110 contacts or approaches close to the display touch surface 400, wherein the sensing unit 210 is coupled to the touch end surface 110 to sense the surface structure of the display touch surface 400, and the signal operation unit 240 adjusts the surface character of the touch end surface 110 according to the surface result signal. In this embodiment, the sensing signal includes the surface-sensing signal, and the sensing unit 210 senses the surface structure of the display touch surface 400 to generate the surface-sensing signal. In practical applications, the sensing unit 210 can be an image sensor, which can sense the surface structure of the display touch surface 400 to generate the surface-sensing signal, wherein the surface-sensing signal can be a stereoscopic image, but not limited thereto. In addition, the sensing unit 210 transmits the surface-sensing signal to the signal operation unit 240, and the signal operation unit 240 generates the deformation signal according to the surface-sensing signal.

It is noted that the signal operation 240 calculates coordinate values of the stereoscopic image on the three-axis coordinate system according to the surface-sensing signal to generate the deformation signal. In other words, the deformation signal is preferably coordinate values on three dimensions, and the three-dimensional coordinate values are respectively the coordinate values of the surface structure of the display touch surface 400 on the X-axis, the Y axis, and the Z-axis.

Moreover, the decoding module 30 calculates corresponding three-dimensional coordinate values according to the parameters on the three axes (deformation signal) to generate the surface-adjusting signal for adjusting the touch end surface 110 to the touch end surface 110A. For example, the touch end surface 110 includes active deformation elements and passive deformation elements, wherein the passive deformation elements may include flexible electrode materials, curvable electrode materials, tenacious electrode materials, or other deformable electrode materials. In practical applications, the active deformation element is connected to the passive deformation element and receives the surface-adjusting signal to enable the deformation in shape of the passive deformation element. In this embodiment, the touch end surface 110A is an inner concave top face, which can slide on the touch bump 401 to promote the touch input efficiency. In other words, the deformed shape of the touch end surface 400A fits the surface structure of the display touch surface 400A. Particularly, since the shape of the touch end surface can fit the display touch surface 400A, by means of the touch input device 1, the user can conduct the touch action on the display touch surface 400A more instinctively. It is noted that the user needs not to change the pen head and saves the time for changing the pen heads, and thus the touch input efficiency is improved. In another embodiment, the sensing unit 210 can be a pressure-feedback sensor, which can physically contact the display touch surface 4000 to sense the surface structure, further to adjust the contour profile of the touch end surface 110.

In addition, the touch end surface 110 can deform to other suitable shapes according to the surface structure of the display touch surface 400. Particularly, the contour profile includes a plane, a curve surface, or a conical surface, and the touch end surface 110 can be a conical surface, an inner concave top surface, an edged surface, or other suitably shaped surfaces.

Figure 3:
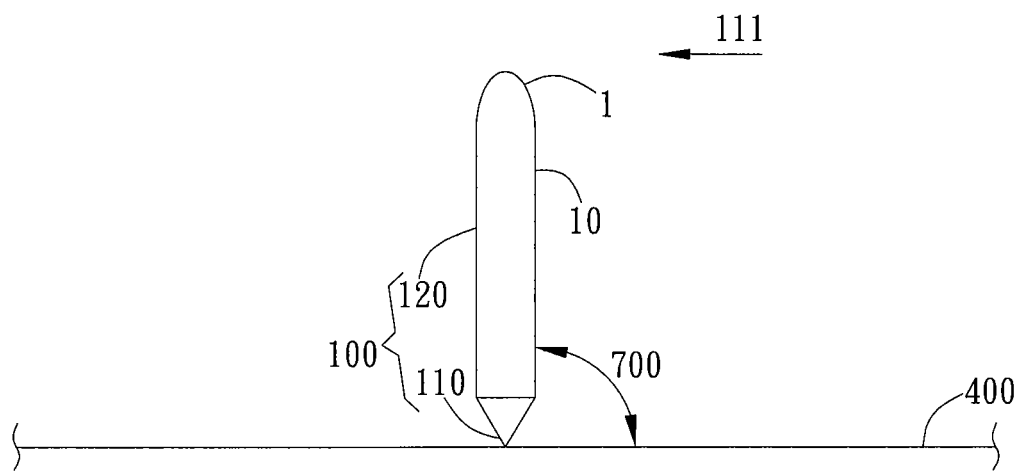
FIG. 3 is a schematic view of the touch input device in another embodiment of the invention.

Referring to FIG. 3, FIG. 3 is a schematic view of the touch input device in another embodiment of the present invention. In this embodiment, the sensing signal includes an angle-sensing signal, and the sensing unit 210 senses the relative angle between the body 10 and the display touch surface 400 to generate the angle-sensing signal. In practical applications, the sensing unit 210 can be a three-axis accelerometer, which can sense the angle and position of the body 1 relative to the display touch surface 400. In this embodiment, the sensing unit 210 has a reference direction and can determine the direction of sensing angle based on the reference direction. That is, the sensing unit 210 can determine the relative angle between the body 10 and the display touch surface 400 based on the reference direction. It is noted that the touch input device 1 can perform default functions at different angles, wherein the default functions include receiving/sending emails, displaying a selection list, entering the power-saving mode, executing the writing mode.

As shown in FIG. 3, the reference direction of the sensing unit 210 is the first direction 111, and the sensing unit 210 determines the value of the specific angle along the first direction 111. It is noted that the user can change the reference direction based on operation preference and custom, not limited to the embodiment. For example, a specific angle 700 is included between the body 10 and the display touch surface 400. In this embodiment, the sensing unit 210 senses the specific angle 700 between the body 10 and the display touch surface 400 to generate the angle-sensing signal, wherein the specific angle is 90 degrees, but not limited thereto. It is noted that when the specific angle is 90 degrees, the corresponding default function is to execute the writing mode. In practical applications, according to the surface result signal, the signal operation unit 240 adjusts the contour profile of the touch end surface 110 to a conical surface so as to facilitate the writing of the touch end surface 110 on the display touch surface 400. In other words, if the touch end surface 110 is originally not a conical shape (e.g. an edged surface or other shapes), the shape of the touch end surface 110 will be deformed as a conical surface according to the surface result signal.

Figure 4:
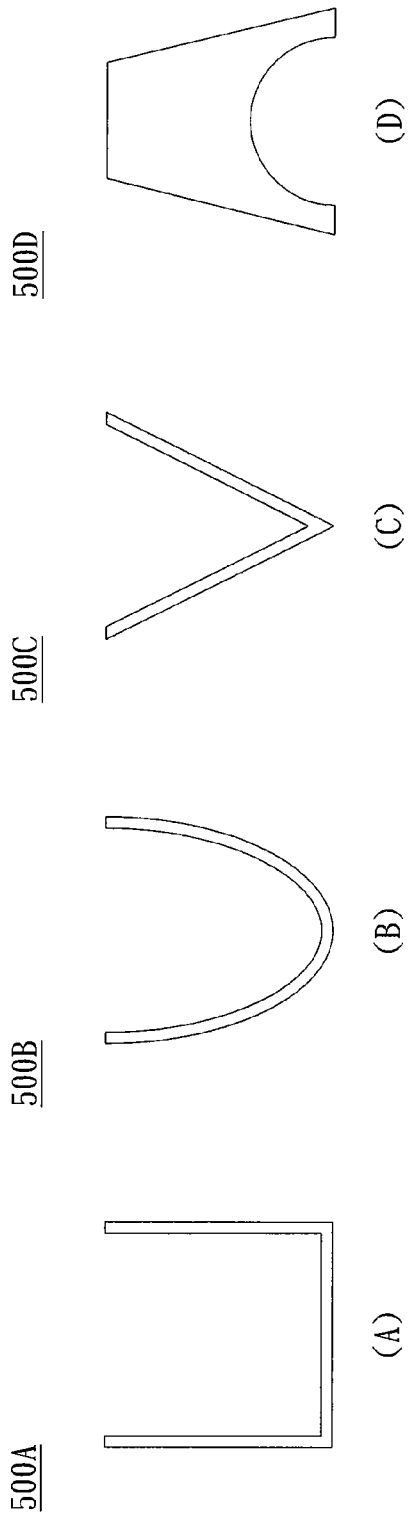
FIG. 4 is a schematic view of the touch end surface in an embodiment of the invention.
Figure 5:
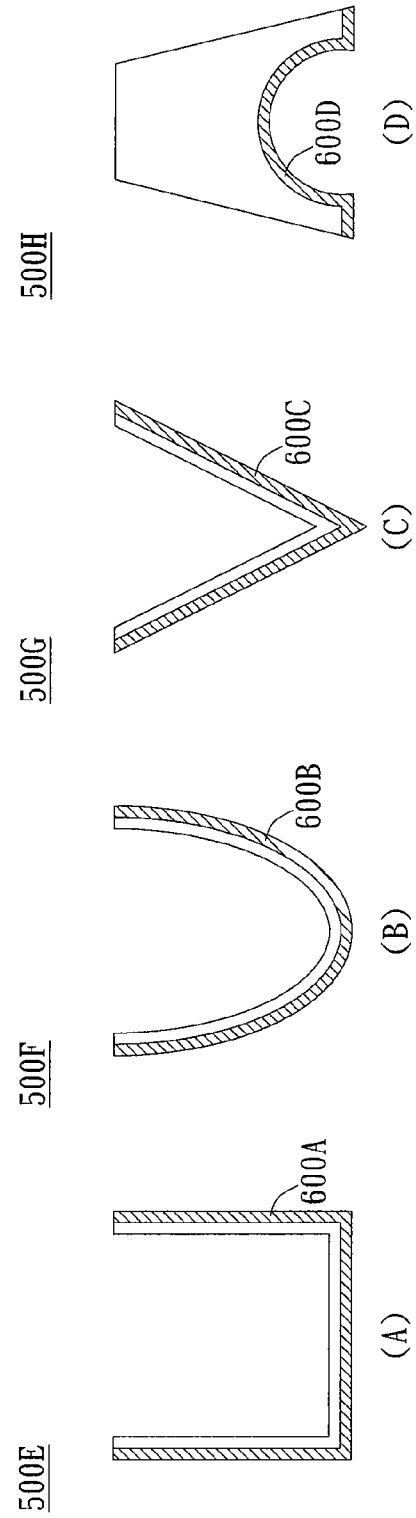
FIG. 5 is a schematic view of the touch end surface in another embodiment of the invention.

Referring to FIG. 4 and FIG. 5, FIG. 4 is a schematic view of the touch end surface in an embodiment of the present invention; FIG. 5 is a schematic view of the touch end surface in another embodiment of the present invention. As shown in FIGS. 4(A), 4(B), 4(C), and 4(D), the shape of the touch end surface includes a plane, a curve surface, a conical surface, wherein the shape of the touch end surface 500A is a plane; the shape of the touch end surface 500B is a curve surface; the shape of the touch end surface 500C is a conical surface; the shape of the touch end surface 500D is an inner concave curve surface. In addition, the material of the touch end surfaces 500A to 50D includes electrode materials. When the touch end surface approaches close to the display touch surface 400, the touch end surface can electrically couple to the display touch surface 400. In other words, the entire surface of the touch end surfaces 500A to 500D serves as an electrode and therefore, the touch input device 1 can achieve a full touch surface sensing, instead of local touch sensing at a specific angle. Moreover, the touch end 500A~500D is an electrode, which can electrically couple with the display touch surface 400 to provide a better sensing performance, effectively solving the poor sensing problem. In practical applications, the touch end surface can be adjusted to different contour profiles according to the surface result signal, not limited to the embodiment.

Referring to FIG. 5, FIG. 5 is a schematic view of the touch end surface in another embodiment of the present invention. As shown in FIGS. 5(A), 5(B), 5(C), and 5(D), the touch end surfaces 500E, 500F, 500G, and 500H are respectively in shape of a plane, a curve surface, a conical surface, and an inner concave curve surface. It is noted that the touch end surfaces 500E to 500H respectively have outer layers 600A to 600D, wherein the outer layers 600A to 600D are a non-conductive outer layer or a conductive outer layer. Particularly, the outer layers 600A to 600D can be a soft thin layer, and the material thereof may include plastics or soft conductors to prevent scratch of the display touch surface 400.

Moreover, in an embodiment, the sensing signal includes a touch-sensing signal, and the sensing unit 210 senses the degree of touch on the external surface 100 to generate the touch-sensing signal. The signal operation unit 240 generates the touch (surface) result signal according to the touch-sensing signal to adjust the surface character of the external surface 100, wherein the surface character includes a friction coefficient or other surface characters.

Figure 6:
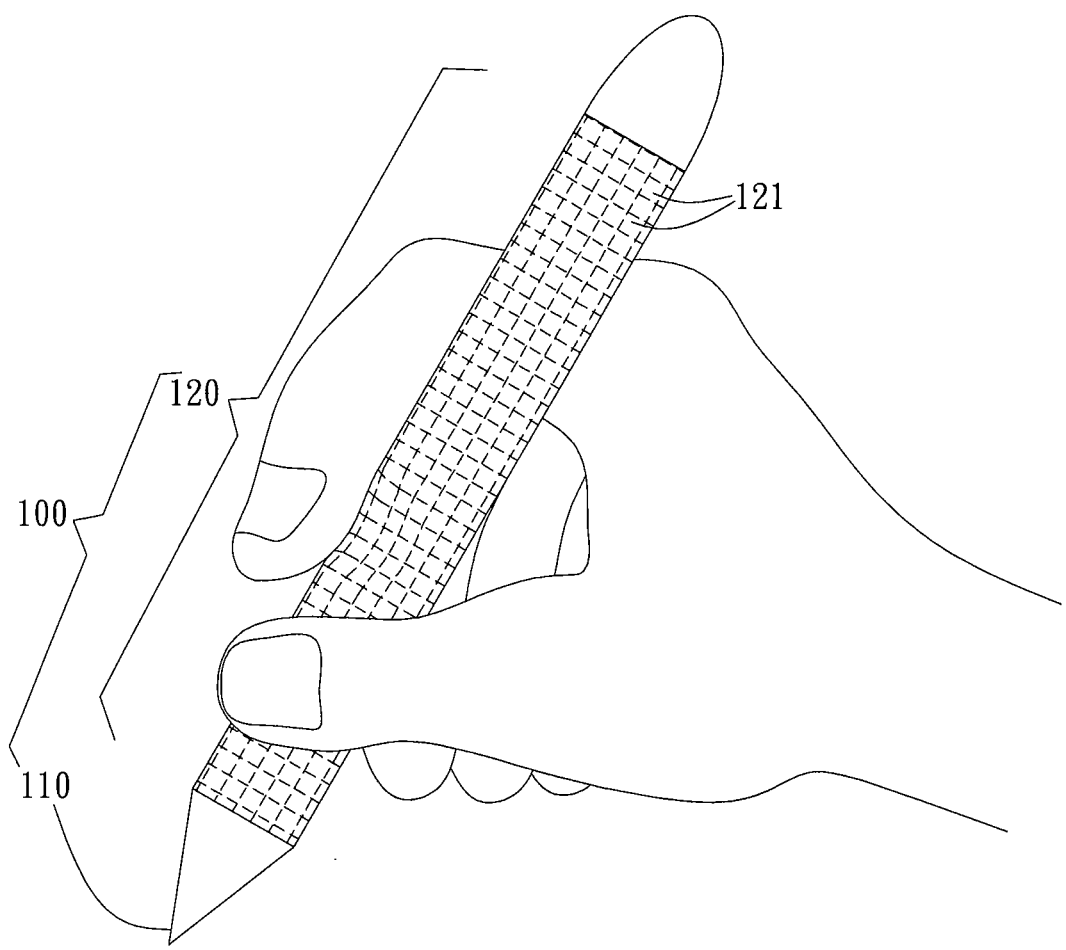
FIG. 6 is a schematic view of the touch input device in another embodiment of the invention.
Figure 7:
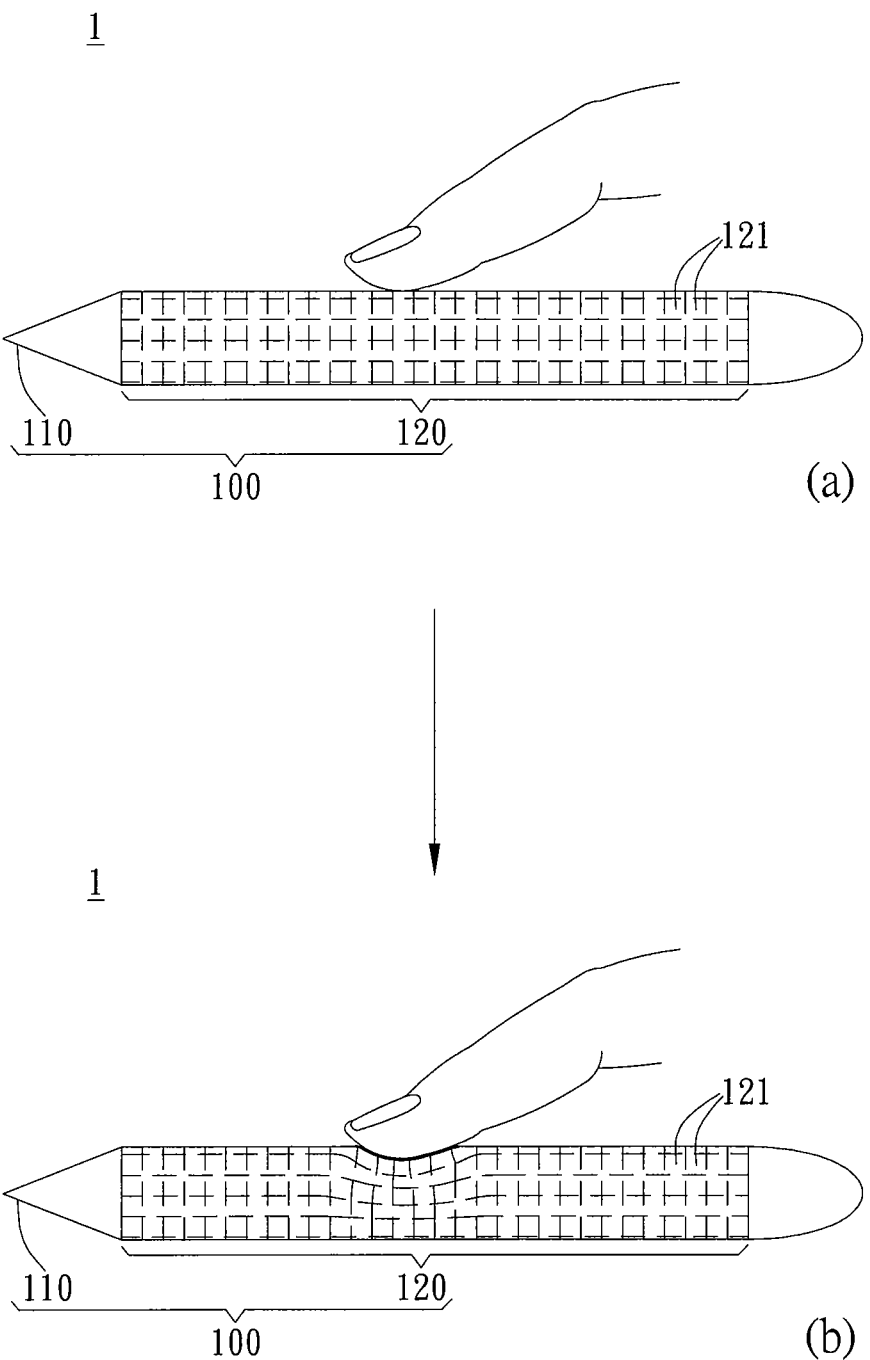
FIG. 7 is a schematic view of the holding areas touched by the finger in an embodiment of the invention.

It is noted that the sensing unit 210 senses the degree of touch on the holding surface 120 to generate the touch-sensing signal and further to adjust the surface character of the holding surface 120. In practical applications, the holding surface 120 can change in shape, friction coefficient, etc. Particularly, the holding surface 120 includes a rough surface, a smooth surface, or a curve surface, but not limited thereto. FIG. 6 and FIG. 7 illustrate the technical features and the effects in other embodiments.

Referring to FIG. 6, FIG. 6 is a schematic view of the touch input device in another embodiment of the present invention. In this embodiment, the holding surface 120 includes a plurality of holding areas 121. The sensing unit 210 can sense the degree of touch on each holding area to generate the touch-sensing signal, wherein the touch-sensing signal includes a pressure signal, a friction signal, or other sensing signals, as appropriate. For example, the sensing unit 210 can be a pressure sensor, a friction force sensor, or other touch sensors. Moreover, the material of the holding surface 120 can be flexible materials, curvable materials, tenacious materials, or other deformable materials, which can generate deformations, but not limited thereto.

Referring to FIG. 7, FIG. 7 is a schematic view of the finger contacting the holding areas in an embodiment of the present invention. As shown in FIG. 7(a), when the user touches the holding areas 121 of the holding surface 120 by finger, the sensing unit 210 senses the pressure exerted onto each holding area 121, and the signal operation unit 240 adjusts the contour profile of each holding area 121 according to the pressure signal. As shown in FIG. 7(b), the finger presses on some of the holding areas 121; the sensing unit 210 senses the pressure exerted onto these pressed holding areas 121 to generate the pressure signal, and the pressure is sent to the signal operation unit 240. Moreover, the signal operation unit 240 calculates the coordinate values of the holding areas 121 on a three-axis coordination system according to the pressure signal to generate the deformation signal. In other words, the deformation signal is preferably coordinate values on three dimensions, and the three-dimensional coordinate values are respectively the coordinate values of the pressed holding areas 121 of the holding surface 120 on the X-axis, the Y axis, and the Z-axis.

Moreover, the decoding module 30 calculates corresponding three-dimensional coordinate values according to the parameters on the three axes (deformation signal) to generate the surface-adjusting signal for adjusting the contour profile of the holding areas 110. As shown in FIG. 7(b), when the finger exerts pressure onto some of the holding areas 121, theses holding areas 121 can deform according to the surface-adjusting signal to achieve the ergonomic operation. It is noted that the holding surface 120 includes active deformation elements and passive deformation elements, wherein the passive deformation elements may include flexible materials, curvable materials, tenacious materials, or other deformable materials. In practical applications, the active deformation element is connected to the passive deformation element and receives the surface-adjusting signal to enable the deformation in shape of the passive deformation element. In practical applications, these holding areas 121 deform according to the surface-adjusting signal to achieve the ergonomic operation and improve the holding feeling.

In another embodiment, the surface result signal includes a friction signal, and the surface character includes the friction coefficient. When the finger of the user touches the holding surface 120, the sensing unit 210 senses the degree of touch on each holding area 121 to generate the sensing signal, and the signal operation unit 240 generates the friction signal to adjust the friction coefficient of each holding area 121. In practical applications, the touch input device 1 can have a plurality of micro particles formed on the holding surface 120 to increase the friction coefficient of the holding areas 121, so as to facilitate the holding of the user onto the touch input device 1A. In other words, the friction coefficient of the holding areas 121 of the holding surface 120 is increased to prevent the slippery feeling when the user holds the touch input device 1, further enhancing the operability of the touch input device 1.

In comparison with the prior art, the touch input device of the present invention utilizes the sensing unit to generate the sensing signal and then adjusts the surface character of the external surface. In practical applications, the external surface includes the pen head surface (i.e. the touch end surface) and the holding surface, and the surface character includes the contour profile, the surface hardness, and the friction coefficient. In an embodiment, the touch input device can change the pen head surface according to the display touch surface and/or adjusts the holding surface according to the degree of touch on the holding surface to improve the input efficiency and provide a better holding feeling.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

The invention claimed is:

1. A touch input device for use with a display touch surface, comprising:
    a body having an external surface enclosing an accommodation space, the external surface including a touch end surface for contacting or being located near the display touch surface; and
    a sensing module disposed in the accommodation space, the sensing module comprising:
        a sensing unit sensing a surface structure of the display touch surface to generate a surface-sensing signal; and
        a signal operation unit generating a surface result signal according to the surface-sensing signal to deform the touch end surface to fit the surface structure of the display touch surface.

2. The touch input device of claim 1, wherein the sensing unit further senses a relative angle between the body and a display touch surface to generate an angle-sensing signal.

3. The touch input device of claim 1, wherein the external surface further includes a holding surface connected to the touch end surface and the sensing unit further senses a degree of touch on the holding surface to generate a touch-sensing signal; the signal operation unit generates a deformation signal according to the touch-sensing signal to deform the holding surface to adjust friction coefficient of the holding surface.

4. The touch input device of claim 1, wherein the surface result signal comprises a deformation signal; the touch end surface is deformed to have a contour profile according to the deformation signal.

5. The touch input device of claim 4, wherein the contour profile comprises a plane, a curve surface, or a conical surface.

6. The touch input device of claim 4, wherein after the touch end surface is deformed, the contour profile of the touch end surface matches the surface structure of the display touch surface.

7. The touch input device of claim 1, further comprising:
    a signal-amplifying unit coupled between the sensing unit and the signal operation unit, wherein the signal-amplifying unit amplifies the surface-sensing signal and transmits the surface-sensing signal to the signal operation unit.

8. The touch input device of claim 1, further comprising:
    a decoding module coupled to the sensing module and receiving the surface result signal, wherein the decoding module generates a surface-adjusting signal according to the surface result signal to deform the touch end surface.

9. A touch input device for use with a display touch surface, comprising:
    a body having an external surface enclosing an accomodation space, the external surface including a touch end surface for contacting or being located near the display touch surface and a holding surface connected to the touch end surface; and
    a sensing module disposed in the accommodation space, the sensing module comprising:
        a sensing unit sensing a degree of touch on the holding surface to generate a touch-sensing signal; and
        a signal operation unit generating a deformation signal according to the touch-sensing signal to deform the holding surface to adjust friction coefficient of the holding surface.

10. The touch input device of claim 9, wherein the holding surface comprises a plurality of holding areas; the holding surface is deformed to adjust the friction coefficient of each holding area.

11. The touch input device of claim 9, wherein the holding surface is deformed to have a rough surface, a smooth surface, or a curve surface.

12. The touch input device of claim 9, further comprising:
    a signal-amplifying unit coupled between the sensing unit and the signal operation unit, wherein the signal-amplifying unit amplifies the touch-sensing signal and transmits the touch-sensing signal to the signal operation unit.

13. The touch input device of claim 9, further comprising:
    a decoding module coupled to the sensing module and receiving the deformation signal, wherein the decoding module generates a surface-adjusting signal according to the deformation signal to deform the holding surface.

* * * * *